United States Patent Office 2,841,528
Patented July 1, 1958

2,841,528
METHOD OF MAKING FUSED TABLETS

Johan Myhre, Oslo, Norway, assignor, by mesne assignments, to Collett & Co. A/S, a corporation of Norway No Drawing. Application September 21, 1954
Serial No. 457,570

11 Claims. (Cl. 167—82)

This invention relates to a method of making compressed tablets and particularly relates to a method of making tablets which are of a glass-like consistency and which offer air-tight protection for easily oxidizable substances.

In the past, compressed tablets have been prepared from granulates in a tablet machine, as is well known to those skilled in the art. The granulate is prepared in such a way that it is free-flowing and, in addition to the basic medicinal ingredient, contains bodying materials such as starch or sugar, binders such as gum arabic and gelatine, as well as lubricating substances such as talcum. The granulate is generally prepared by one of two well known methods, the dry and the wet method. According to the dry method, the powdered components are compressed into relatively large tablets which are subsequently ground or crushed into a granulate. According to the wet method, a granulate is prepared by moistening the components with a liquid such as an aqueous solution of gelatin or alcohol, whereupon the mass is pressed through a sieve to form a series of granules which are then dried. The granulate, prepared according to either of these methods, is then pressed into tablets. The tablets have a heterogeneous appearance. They are easily crushed and have substantially no resistance to oxidation. In other words, the tablet consists of a powdered mass which is compressed into a coherent unit but which nevertheless can be readily penetrated by air.

Another type of tablet can be prepared in accordance with my Patent No. 2,676,136, wherein a medicinal ingredient is incorporated into a mass, such as sugar, the mass being a liquid at elevated temperatures and a solid at room temperature. While the mass is in a plastic form, it is passed through a candy drop machine and the mass formed into tablets or pellets. Such pellets are homogeneous and have a glass-like appearance upon being broken and have excellent protective properties with respect to oxidation. However, such pellets or tablets do suffer from the defect that it is difficult to make them entirely uniform to appearance.

The present invention relates to a method of preparing tablets which have substantially all of the advantages of conventional tablets and, at the same time, incorporate the advantages of the pellets produced in accordance with my above identified patent.

It is an object of the present invention to provide tablets whereby the active ingredients are hermetically sealed to penetration by air thus obtaining exceptional protection for easily oxidizable substances within the glass-like matrix of this tablet.

Another object of this invention is to provide a method of making tablets which are unique in appearance, texture and taste, utilizing conventional tablet making machinery.

Another object of this invention is to provide a superior method of incorporating chemically incompatible active ingredients in the tablet.

Further objects and features of advantage will be found in the detailed description of the invention which follows.

In general, the present invention is accomplished by preparing a granulate or powder of a substance which is solid at room temperature, but which melts or fuses to a homogeneous mass at an elevated temperature. According to the present invention, a granulate is first prepared, compressed into tablets, and the compressed mass then exposed to a fusion process, resulting in a homogeneous, hermetically sealed tablet with a glass-like consistency.

Although this invention has as its primary object the preservation of easily oxidizable materials and in particular vitamins such as A, C, D, E and K, it can be easily applied to many pharmaceutical products. It can be advantageously applied to multivitamin and mineral preparations, as is hereinafter specified in more detail.

In carrying out the present invention, the first step is to prepare the granulate containing the pharmaceutical agent. As a basis for this granulate, sugar is preferred, including sucrose as well as any other mono- or di-saccharide such as glucose, maltose and the like, as well as impure sugar syrups such as corn syrup, molasses and partial hydrolysis products of polysaccharides. Other materials may be used such as sorbitol, mannitol, and gelatine in combination with sugar and glycerin, as well as vegetable gums, methylcellulose, waxes, hydrogenated fats, resins and synthetic polymers.

In preparing the granulate, it is ordinarily preferred to use an emulsifying agent to obtain a fine dispersion of the lipoidal substances. In the cases of vitamins A and E, it has been shown that the use of these emulsifying agents will markedly increase their biological utilization. However, the emulsifying agent is not necessary from the standpoint of mechanically dispersing an oil in the matrix material. Many emulsifying agents can be used such as vegetable gums including gum acacia, or tragacanth, and partial esters of polyoxylene derivatives of sorbitan with fatty acids. Other surface-active agents which have been found suitable include the bile acids and bile salts, chondrus, agar, albumin, soap bark, triethanolamine and its esters, monoglycerides of fatty acids, cholesterol, cetyl alcohol, sodium lauryl sulfate, sodium alginate, methylcellulose, lecithin, sulfated hydrogenated castor oil, and quaternary ammonium compounds. Of course, other substances such as coloring materials and flavoring agents may be added.

The preparation of matrix material can be done in the same manner as disclosed in my Patent No. 2,676,136. First, a sugar syrup is heated to drive out water. The sugar syrup may be a commercial syrup such as corn syrup or may be prepared by adding water to sugars. The heating may be done under an atmosphere of nitrogen or under vacuum. The heating is continued until only the desired quantity of water is left and then allowed to cool. The desired quantity of water which is left in the sugar syrup may be readily determined by experiment and is that quantity which will yield a product of the desired solidity upon final cooling. The quantity of water may be varied from about .5% to 7.5% by weight of the finished mass. Ordinarily, the syrup is heated to a temperature of about 150° C., though the exact temperature is dependent upon the composition of the syrup. The material is then cooled to a temperature whereat it still remains plastic and workable, ordinarily about 90° C., whereupon the pharmaceutical ingredients are added to the mixture. The mixture is then further cooled to form a solid. While it is cooling, it can be poured into the form of thin sheets, or it can be run through a drop machine or other device to form pieces of convenient size. The cooled solid material is then ground to a suitable particle size in a grinder. For convenience in the subsequent working of the tablet machine, fineness of the powder is ordinarily adjusted to the tablet size. Thus, about a 20-mesh granulate would be used for 3/16" diameter tablets, 16-mesh for 5/16" tablets, 12-mesh granulate for 7/16" tablets, and the like. The resulting powder is then granulated in accordance with well-known procedures and compressed into tablets in a standard tablet machine. The tablets are then placed in a drying cabinet with circulating air current and thermostatic heat control and kept at a temperature of about 50°–55° C. for 15 to 30 minutes. The purpose of this heat treatment is to obtain a surface fusion of the sugars which gives a hard glazed surface to the tablet, and provides protection during the subsequent coating process. This initial heat treatment is highly desirable since compressed tablets made in accordance with the present technique are initially somewhat porous and too much moisture from the coating syrup might penetrate into the tablets if they were not first heat treated. The tablets are then transferred to a coating pan and coated with a sugar syrup in accordance with standard tablet coating procedure. The coated tablets are then transferred to trays which are placed in a drying cabinet and kept at a temperature of about 65° C. for about five hours. This heating results in a complete fusion of the corpus materials. A cut through the fused tablet shows a hard, compact mass of glass-like appearance which provides exceptional protection for the substances incorporated in the tablet.

The coating operation may be carried out in two steps by first applying a fairly thin coating, which serves as a protection against oxidation and against deformation of the tablet during the fusion process. The coating may then be completed after the fusion process.

The following non-limiting examples illustrate various embodiments of the present invention.

*Example I.—Vitamin A/D tablets containing 5000 USP A and 500 USP D per tablet*

Basic syrup mixture:

|  | Grams |
|---|---|
| Lactose | 16,000 |
| Glucose syrup (80% solids) | 16,500 |
| Sucrose | 33,000 |
| Water | 4,000 |
| Red color | 50 |

The glucose syrup, lactose and sucrose are placed in a stainless steel kettle, supplied with a steam jacket and agitator, and heated (steam pressure 120 lbs./sq. in.) under constant agitation. When the temperature is close to 100° C., the red color dissolved in 500 cc. of water is added. The heating and agitation is continued until the temperature has reached 153° C. The material is then cooled down to 95°–100° C., at which temperature it has the consistency of a heavy syrup, and 1,260 grams of vitamin A/D concentrate containing 1,000,000 USP units A and 100,000 USP units D per gram are added. Before adding the vitamin concentrate, 100 grams of glycerol monostearate (emulsifying agent) are dissolved in the oil by gentle heating. The concentrate is mixed into the sugar syrup by continuous stirring until a complete homogeneous mixture (emulsion) is formed. Care is taken to avoid mixing air into the mass. Then, 300 grams of raspberry essence and 200 grams of citric acid are mixed in. The temperature is kept at about 95° C. during these operations (low pressure steam in the jacket). The mass is now cooled down to about 70° C. and then passed through rollers and formed into sheets. After cooling to room temperature, the material becomes brittle and the sheets are broken up into small pieces and ground to a powder of 16-mesh size in a mill.

The powder is then granulated according to standard procedures and is then compressed in a standard tablet machine into tablets weighing 250 mg. each.

The tablets are sifted to remove "fines" and then surface fused by placing them in a drying cabinet for 15–30 minutes at 55° C. The purpose of this is to obtain a surface fusion. The surface fused tablets are coated with a 66% sugar solution (2 parts sucrose, 1 part water) containing some red color. Confectionary sugar is used in combination with the sugar syrup (added in small amounts through a sieve between each layer of sugar syrup). Hot air (about 30° C.) is blown into the coating pan to speed up the drying.

The coated tablets are placed on trays in a drying cabinet at 65° C. for four hours. This heat treatment results in complete fusion and the tablets become translucent.

Finally, the tablets are polished. A wax solution of the following composition is used as a polishing liquid:

| Cera alba wax | grams | 50 |
|---|---|---|
| Carnauba wax | do | 50 |
| $CHCl_3$ | ml | 400 |

The polishing is carried out in the conventional manner in a canvas covered polishing pan.

*Example II.—Multivitamin tablets*

Per tablet:
  5,000 USP units A
  500 USP units D
  4.0 mg. vitamin $B_1$
  2.0 mg. vitamin $B_2$
  5.0 mg. Ca pantothenate
  20.0 mg. niacinamide
  0.1 mg. vitamin $B_6$
  0.5 mcg. vitamin $B_{12}$
  37.5 mg. ascorbic acid Basic syrup mixture:

|  | Grams |
|---|---|
| Lactose | 750 |
| Corn syrup (80% solids) | 750 |
| Sucrose | 1,500 |
| Water | 400 |
| Yellow color | 129 |

The first part of the process was repeated as in Example I, with the exception that the heating was continued until the temperature reached 158° C.

The mass was then cooled down to 95° C. and 32.5 grams of vitamin A/D concentrate, in which were dissolved 3.0 grams of Span 60, added. The concentrate contained 842,000 U. S. P. units A and 84,200 U. S. P. units $D_2$ per gram.

After the concentrate was mixed in, as described in Example I, there were added the following water soluble vitamins:

|  | Grams |
|---|---|
| Ascorbic acid | 206.2 |
| Niacin amide | 82.5 |
| Riboflavin | 11.0 |
| Pyridoxin | .55 |
| Ca pantothenate | 27.50 |
| Thiaminchloride | 11.00 |

These materials were first sifted through a 25-mesh screen and then mixed into the corpus material in combination with 30 grams of lemon oil. The thiaminchloride was added last. Stirring was continued until the mixture was completely homogeneous. The temperature was kept at about 90° until all the vitamins were mixed in. Then the mass was cooled down to 70–80°, formed into sheets and further treated as described in Example I. The granulate was compressed into tablets weighing 650 mg.

The tablets were surface-fused and coated as in Example I and then kept in a drying cabinet for six hours at 60° C. The fused tablets were polished. The finished tablets weighed 690 mg. each.

Example III.—Multivitamin and mineral tablet (chocolate flavored)

Basic syrup mixture:

|  | Grams |
|---|---|
| Lactose | 300 |
| Glucose syrup | 300 |
| Sucrose | 600 |
| Water | 100 |

The first part of the process was carried out as described in Example I (heated to 152° C.).

Then were mixed in 150 grams of cacao powder. This brought the temperature down to 105° C. After cooling the mass down to about 95° C., 26.2 grams vitamin A/D concentrate (842,000 U. S. P. A and 84,200 U. S. P. $D_2$ per gram), in which had been dissolved 2.5 grams of glycerol-monostearate, were added. The concentrate was mixed as described in Example I.

Then were added the following amounts of water soluble vitamins and minerals:

|  | Grams |
|---|---|
| Sodium ascorbinate | 183.5 |
| Thiaminchloride | 6.6 |
| Riboflavin | 6.6 |
| Niacinamide | 44.0 |
| Pyridoxine | 2.2 |
| Ca pantothenate | 16.5 |
| $B_{12}$ | 4.4 |
| Ferrum reductum | 20.0 |
| $MnSO_4 + H_2O$ | 6.15 |
| MgO | 3.30 |
| KI | .40 |
| $CuCO_3Cu(OH)_2 + 2H_2O$ | 3.75 |
| ZnO | 2.50 |
| $Na_2MoO_4 + 2H_2O$ | 1.00 |
| $CoSO_4 + 2H_2O$ | .96 |

When all the minerals and vitamins were mixed in ($B_{12}$ and thaminchloride added last), there were added 12 grams of cacao essence and 6 grams of orange oil.

The temperature of the mixture was now reduced to about 85°. Further treatment as described in Example I.

The granulate was compressed into tablets weighing 800 mg.

The tablets were kept at 50° C. for 50 minutes and then coated with a colored 66% sugar syrup (2 parts sucrose, 1 part water), which contained 3.5 grams of iron oxide, brown, 1.5 grams of iron oxide, red, and 50 grams of cacao essence per kgm. of sugar syrup.

This sugar syrup was used in combination with confectionary sugar (added through a sieve between each application of the syrup).

The coating operation was interrupted when the tablets had a thin layer of coating and they were then placed in the drying cabinet at 60° for 5½ hours.

The coating process was completed after the tablets were fused. After the coating dried, the tablets were polished as described above. The finished tablets contained, per tablet:

| Vitamin A | U. S. P. units | 10,000 |
|---|---|---|
| Vitamin $D_2$ | U. S. P. units | 1,000 |
| Vitamin $B_1$ | mg | 3 |
| Vitamin $B_2$ | mg | 3 |
| Ca pantothenate | mg | 5 |
| Niacinamide | mg | 20 |
| Vitamin $B_6$ | mg | 1 |
| Vitamin C | mg | 75 |
| Vitamin $B_{12}$ | mcg | 1 |
| Fe | mg | 10 |
| Mn | mg | 1.0 |
| Mg | mg | 1.0 |
| I | mg | .15 |
| Cu | mg | 1.0 |
| Zn | mg | 1.0 |
| Mo | mg | .20 |
| Co | mg | .10 |

Example IV

Basic syrup mixture:
 1130 grams corn syrup (80% solids)
 120 grams gum arabic (15% moisture)
 150 grams water
 1 gram red color The gum arabic was dissolved in the water and the corn syrup mixed in. The mixture was then heated with constant agitation until the moisture content was 10%. After cooling to about 95° C., there were mixed in 48.4 grams of vitamin A/D concentrate containing 1,000,000 U. S. P. units A and 100,000 U. S. P. units D per gram, and 5.5 grams of raspberry essence. Further treatment as described in Example I. Weight of the tablets before coating 250 mg.; after coating, 280 mg. Each tablet contained 10,000 U. S. P. units A and 1,000 U. S. P. units D.

Example V

Basic syrup mixture:
 500 grams sorbitol
 625 grams corn syrup (80% solids)

The sorbitol was melted in the corn syrup and the mixture heated until the moisture content was 1%–3%. Then were added 5 grams of raspberry essence and sufficient vitamin A/D concentrate to give the finished tablet a vitamin A and D content of 5,000 A and 500 D per tablet. Further treatment as described in Example I.

Example VI

A mixture containing glucose syrup and gum acacia was prepared wherein the mixture contained about 50% water and the sugar solids constituted about 90% of the solids in the mixture. The mixture was heated to about 60° C. and 1 gram of a vitamin concentrate was added for each 40 grams of the mixture. The vitamin concentrate containing 1,000,000 U. S. P. units of vitamin A per gram and 100,000 U. S. P. units of vitamin D per gram. The hot emulsion was then sprayed into a spray drier and dried. The spray dried powder thus provided was made into tablets and fused as in Example I.

Example VII

Multivitamin tablets were made with the same formula and technique as in Example II except that only the vitamins A and D were mixed into the hot corpus mass. After the mass was cooled and ground, the other vitamins were added to the granulate and well mixed in. The granulate was then formed into tablets and fused as before.

The procedure of Example VII is particularly advantageous with substances which are heat labile, such as penicillin or nitroglycerol. By using this procedure, it is not necessary to expose the active ingredient to the elevated temperature used in the initial making of the corpus.

Example VIII

The process of Example I was repeated except that 1,500 grams of oil of garlic was used instead of the vitamin A and D concentrate.

Example IX

The process of Example I was repeated except that 1,200 grams of phenobarbital was incorporated in the heavy syrup.

Example X

The process of Example I was repeated except that 1,600 grams of alpha tocoperol was added to the heavy syrup in place of the vitamin A and D concentrate.

Example XI

A basic syrup mixture was prepared as described in Example II, the syrup cooled to produce a solid material and ground to a powder.

The water soluble vitamins, as specified in Example II, were mixed with this powdered material and a granulate prepared as described in Example I. The granulate was then formed into tablets and fused as before.

Example XII 591.8 grams of confectionery sugar and 250 grams of Sterotex (hydrogenated vegetable fat) were mixed with:

100 grams ascorbic acid
6 grams thiaminchloride
6 grams riboflavin
6 grams calcium pantothenate
40 grams niacin
.2 gram pyridoxine The mixture was granulated as described in Example I and formed into tablets weighing 500 mg. The tablets were placed in a drying cabinet at 70° C. for one hour and fused into a homogeneous mass.

Many other substances can be made into tablets following the technique of the present invention such as phenylephrine hydrochloride, ephedrine sulfate, codeine sulfate, theophyllin, scopolamine hydrochloride, atropine sulfate, hormones such as estradiol, estrone, ethinyl estradiol, hexastrol, as well as antibiotics such as bactracin, penicillin and tyrothricin.

Although the above examples relate to certain specific pharmaceutical products, it must be understood that the process is one of general application and that substantially any material can be used. For instance, the process can be used for candy manufacture and is particularly applicable to the making of small candy tablets. Further, the process is applicable to the manufacture of cencentrated flavor tablets.

In some instances, unusual effects can be produced by mixing granulates made with different materials. Thus, granulates of different colors can be mixed to produce tablets with a marbled color, or granulates can be mixed which contain different pharmaceutical agents.

Clinical studies conducted with human subjects comparing the relative physiological availability of vitamin A when administered in aqueous dispersions, gelatin capsules and in pellets prepared in accordance with my Patent 2,676,136 have clearly demonstrated that vitamin A is more effectively absorbed when administered in the pellet.

Similar clinical tests on vitamin E conclusively demonstrated the superiority of the pellet as vehicle for an oil soluble vitamin.

Extensive stability tests have shown that fused tablets prepared in accordance with the present invention provide excellent protection for easily oxidizable materials.

The effect of the fusion process on stability is indicated by the following stability data for vitamin A in fused and unfused tablets, prepared as described in Example III.

The tablets were analyzed as soon as prepared and the vitamin A content in U. S. P. units per tablet determined. The tablets were then subjected to accelerated stability tests at 25° C. and 37° C.

The results were as follows:

and heating the thus-formed tablet to a temperature whereat the tablet fuses to a homogeneous, glassy mass.

2. The method of claim 1 wherein the granulate contains an emulsifying agent, sugar and at least one member selected from the group consisting of solid and liquid pharmaceutical agents.

3. The method of claim 1 wherein the granulate contains discrete particles of fused sugar with at least one member selected from the group consisting of solid and liquid pharmaceutical agents.

4. The process of making tablets comprising heating a sugar syrup to a temperature of about 150° C., said heated syrup containing from about 0.5% to 7.5% by weight water, dispersing at least one member selected from the group consisting of solid and liquid pharmaceutical agents in the heated syrup, cooling the syrup to produce a solid material, grinding the solid to make a finely divided solid, tableting said finely divided solid, and heating the thus produced tablet to fuse it into a homogeneous mass.

5. The process of claim 4 wherein the syrup contains an emulsifying agent.

6. The process of claim 4 wherein the pharmaceutical preparation comprises a fat soluble vitamin.

7. The process of making tablets comprising heating a sugar syrup said syrup consisting essentially of a member selected from the group consisting of mono- and disaccharides, said heating being continued to a temperature of about 150° C., said syrup containing from about 0.5% to 7.5% by weight water, dispersing at least one member selected from the group consisting of solid and liquid pharmaceutical agents in the heated syrup, cooling the syrup to produce a solid material, grinding the solid to make a finely divided solid, tableting said finely divided solid, applying a thin coating to the tablet, and heating the coated tablet to a temperature of from about 50° C. to about 65° C. to fuse the tablet into a homogeneous mass.

8. The process of making tablets comprising heating a sugar syrup said syrup consisting essentially of a member selected from the group consisting of mono- and disaccharides, said heating being continued to a temperature of about 150° C., said syrup containing from about 0.5% to 7.5% by weight water, dispersing at least one member selected from the group consisting of solid and liquid pharmaceutical agents in the heated syrup, cooling the syrup to produce a solid material, grinding the solid to make a finely divided solid, tableting said finely divided solid, heating the thus formed tablet to a temperature of from about 50° to 55° C. for from 15 to 30 minutes, coating the tablets with sugar and heating the coated tablets to a temperature of about 65° C. for about five hours.

9. The process of making tablets comprising heating a sugar syrup said syrup consisting essentially of a member selected from the group consisting of mono- and disaccharides, said heating being continued to a temperature of about 150° C., said syrup containing from about 0.5% to 7.5% by weight water, cooling the syrup to produce a solid material, grinding the solid material to make a finely divided solid, mixing this finely divided solid with at least one member selected from the group consisting of solid and liquid pharmaceutical agents and granulating the mixture, tableting the granulate and applying a thin coating to the tablet and heating the coated

|  | USP units/ tablet analysis immediately after preparation | USP units per tablet after storage | | | | | | | |
|---|---|---|---|---|---|---|---|---|---|
|  |  | At 25° C. | | | | At 37° C. | | | |
|  |  | 2 Weeks | 4 Weeks | 8 Weeks | 12 Weeks | 2 Weeks | 4 Weeks | 8 Weeks | 12 Weeks |
| Unfused Tablets | 5,500 | 5,340 | 3,495 | 2,100 |  | 3,600 | 2,050 |  |  |
| Fused Tablets | 5,530 | 5,500 | 5,540 | 5,500 | 5,520 | 5,540 | 5,500 | 5,540 | 5,520 |

I claim:

1. The method of making tablets comprising tableting a granulate of an edible substance which is a solid at room temperature and which is capable of fusing at an elevated temperature consisting predominantly of a sugar tablet to a temperature of from about 50° C. to about 65° C. to fuse the tablet into a homogeneous mass.

10. The process of making a vitamin tablet comprising: heating a sugar syrup containing about 0.5 percent to 7.5 percent by weight of water to a temperature of about 150° C., cooling said syrup to a temperature of about 90° C., emulsifying a fat soluble vitamin in said syrup, cooling the syrup to substantially room temperature to produce a hard mass, breaking said mass into a granulate, tableting said granulate to produce a tablet, and heating said tablet to a temperature of from about 50° C. to about 65° C. whereat said tablet fuses into a homogeneous mass.

11. The process of making a vitamin tablet comprising: heating a sugar syrup containing about 0.5 percent to 7.5 percent by weight of water to a temperature of about 150° C., cooling said syrup to a temperature of about 90° C., emulsifying a fat soluble vitamin in said syrup, cooling the syrup to substantially room temperature to produce a hard mass, breaking said mass into a granulate, incorporating in said granulate at least one member selected from the group consisting of water soluble vitamins and minerals, tableting said granulate to produce a tablet, and heating said tablet to a temperature of from about 50° C. to about 65° C. whereat said tablet fuses into a homogeneous mass.

References Cited in the file of this patent

UNITED STATES PATENTS

| | | |
|---|---|---|
| 401,657 | Oberhaeusser | Apr. 16, 1889 |
| 1,826,701 | Ames et al. | Oct. 13, 1931 |
| 1,834,763 | Bonsieur | Dec. 1, 1931 |
| 2,086,386 | Merrill | July 6, 1937 |
| 2,163,629 | Rapp et al. | June 27, 1939 |
| 2,359,674 | Pollock | Oct. 3, 1944 |
| 2,676,136 | Myhre | Apr. 20, 1954 |

FOREIGN PATENTS

| | | |
|---|---|---|
| 621,651 | Great Britain | Apr. 13, 1949 |

OTHER REFERENCES

Q. S.: vol. 1, No. 4, Spring 1952.